INVENTORS
VICTOR SHANOK
BY JESSE P. SHANOK

ATTORNEYS

United States Patent Office 3,565,734
Patented Feb. 23, 1971

3,565,734
COMPOSITE MOLDING STRIP
Victor Shanok and Jesse P. Shanok, both of 863 65th St., Brooklyn, N.Y. 11220
Filed Aug. 28, 1967, Ser. No. 663,670
Int. Cl. B32b 3/30, 15/08
U.S. Cl. 161—5                              8 Claims

ABSTRACT OF THE DISCLOSURE

The invention is directed to a composite strip suitable for use as a molding strip or a trim strip, or the like, comprising a metal foil member encased within a transparent plastic material, said metal foil member being adapted to impart structural strength to said plastic material, as well to impart an exceedingly decorative feature thereto.

BACKGROUND OF THE INVENTION

(1) Field of the invention

This invention relates to a composite molding strip, trim strip, or the like, adaptable for disposition in a flat position.

(2) Description of the prior art

Plastic coated flexible strips, in which usually a thin ribbon or tape of metal foil is encased within a transparent thermoplastic material, are of course well known. However, it has been a problem in these prior art metal foil plastic encased molding strips that little or no structural strength is imparted to the composite molding, especially along the longitudinal axis thereof. This is because the metal foil when encased has a generally linear transverse cross-section, so that when a long flat molding strip is produced, it will be structurally weak by virtue of being susceptible to bending along the longitudinal dimension thereof, the transverse linear cross-section of the metal foil providing little or no resistance to such bending. While trim strips have also been made where the foils is encased in an arcuate or non-linear transverse cross-sectional disposition, this similarly provides a trim strip susceptible to bending along its longitudinal dimension since the metal foil is encased in an essentially smooth line disposition, even though it may be arcuate or non-linear in cross-sectional conformation. In other words, although the metal foil does not have a linear cross-section, as above described, the arcuate trim strip is still susceptible to bending at times even of its own weight, since the embedded foil has a linear or smoothly curving cross-section with no deflections in the smooth running of the curve.

SUMMARY OF THE INVENTION

It is, therefore, among one of the principal objectives of the invention to provide an improved composite molding or trim strip employing a metallic foil encased in a transparent plastic material which composite molding has added structural strength, including resistance to longitudinal flexure imparted thereto by the metallic foil.

In accordance with the present invention an improved composite molding strip has been provided which comprises a metal foil member encased within a transparent plastic material, said foil member being adapted to impart added structural strength to said plastic material along its longitudinal dimension, said foil member having a generally non-linear, regularly deflected, transverse cross-section. The resultant composite is eminently suitable for molding strips whose transverse axis is substantially a straight line. The transparent plastic material is any suitable thermopalstic material, such as vinyl chloride, cellulose acetate butyrate, and the like.

BRIEF DESCRIPTION OF THE DRAWING

The invention will be hereinafter more fully described with reference to the accompanying drawing in which.

DESCRIPTION OF THE PREFERRED EMBODIMENTS

Figure 1:
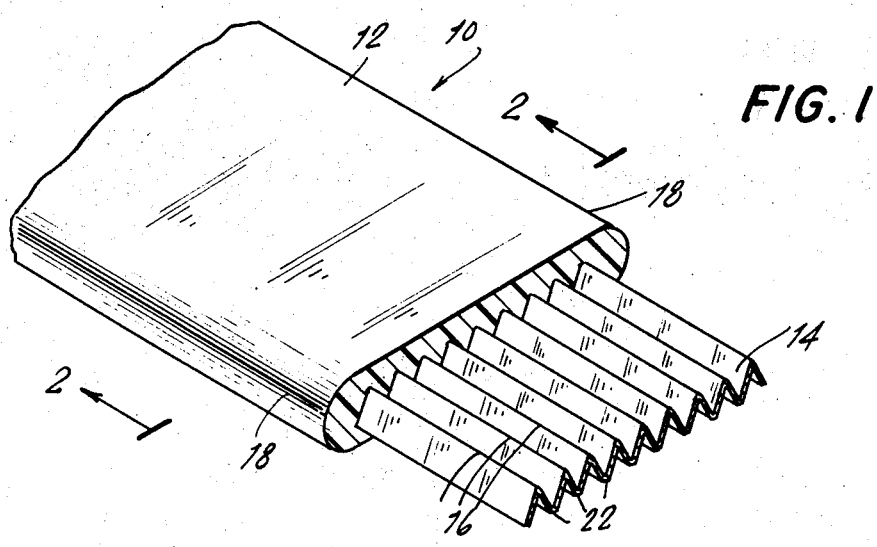
FIG. 1 is a fragmentary view in perspective of the invention molding strip, in one of its embodiments.
Figure 2:
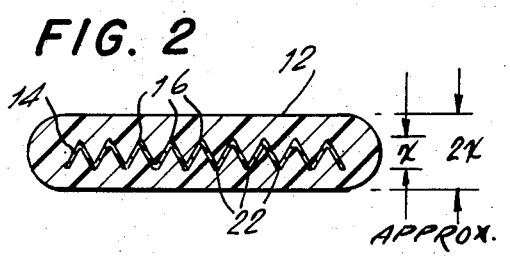
FIG. 2 is a sectional view taken along line 2—2 of FIG. 1 in the direction of the arrows immediately behind the numerals.

Referring now to the figures of the drawing, for purposes of illustration, FIG. 1 depicts a molding strip 10 comprising a flat transparent plastic material 12 in which is encased a metal foil 14, the plastic material being cut away to expose part of the metal foil 14. The metal foil 14 is encapsulated in the plastic material 12 by conventional extrusion apparatus, not shown. As seen in FIGS. 1 and 2, the foil 14, as encased, is longitudinally pleated having a plurality of pleats 16 traversing the foil 14 in longitudinal fashion, and parallel to each other, and to the sides 18 of plastic material 12. Thus, looking at FIG. 2, it is apparent that the transverse cross-section of foil 14 is not linear or smoothly curving, but is rather regularly deflected. An imaginary base line drawn to connected the peaks 22 of pleats 16, in horizontal fashion, would produce a plurality of substantially equilateral triangles. Thus, putting it another way, coil 14 can be described as being "accordion pleated." The vertical height or amplitude of pleats 16 (FIG. 2) is preferably of "X" dimension, with the width of plastic material 12 being "2X." However, this 2:1 dimensional ratio is not critical and may be widely varied, as desired. A flat composite strip 10 is therefore provided which resists bending along its longitudinal dimension. This is especially important in producing long molding strips, which obviously are particularly susceptible to bending by virtue of their long length. A strip produced in accordance herewith is structurally strong and highly resistant to bending along its longitudinal dimension.

Figure 3:
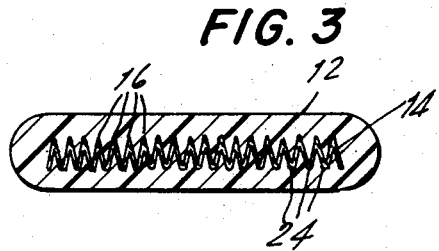
FIG. 3 is a view similar to FIG. 2, except that the metal foil has an increased number of deflections.

It has also been found that by increasing the number of pleats 16 (i.e., increasing the number of regular deflections), FIG. 3, that an even stronger strip can be made. Thus, an imaginary line drawn to connect the peaks 24 of pleats 16, in horizontal fashion, would produce a plurality of triangles having a base shorter than the two remaining equilateral sides. Drawing again the analogy of "accordion pleating," it can be said that to add even further strength to strip 16, the "accordion pleats," if the freqpuency is increased, are pushed closer together, and more of them are provided.

Figure 4:
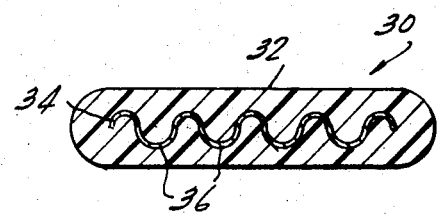
FIG. 4 is a view similar to FIG. 2, and shows the invention molding strip in another embodiment.

In FIG. 4 there is shown still a further embodiment of the invention. In this embodiment, a composite molding strip 30 also comprises a flat transparent plastic material 32, but there is now encased in said plastic material a metal foil 34 whose transverse cross-section is defined as sinuous in conformation. Similar to the embodiments described hereinabove, the sinuous nature of the foil 14 imparts added structural strength to strip 30 by virtue of its resistance to longitudinal bending. Similarly, also, the sinuousity of the foil 34 can be increased by providing more curves 36 therein, thereby resulting in even more strength being imparted to the molding strip.

Since the plastic material making up the coating of the composites, according to the invention, is preferably transparent, it will be apparent that by the unusual configurations provided to the foil, an extremely decorative composite trim strip is produced. The thickness of the metal foils employed in the invention is generally about 0.002 to 0.006 inch. Thus, for example, an aluminum foil of approximately 0.002 inch is readily encased within a shell of cellulose acetate or cellulose acetate butyrate in clear form to produce a rigid body which is extremely decorative and ornamental in appearance. In one form, the aluminum strip may be 0.002 inch in thickness, the amplitude of the pleat dimension, "X," 0.030 inch and the total thickness of the strip dimension "2X" 0.60 inch.

Having thus described the invention as applied to specific embodiments thereof, it is to be understood that various changes may be made by those skilled in the art, without departing from the spirit and scope thereof.

What is claimed is:

1. A composite molding strip comprising a metal foil member encapsulated within a thermoplastic material, said foil member having a non-linear, repetitious, pleated, regularly deflected, transverse cross-section, said pleats being disposed in parallel longitudinal relationship along the longitudinal dimension of said thermoplastic material, and said foil member imparting structural strength to said molding strip along said longitudinal dimension thereof.

2. A composite molding strip in accordance with claim 1, wherein said thermplastic material is transparent.

3. A composite molding strip in accordance with claim 2, wherein the incidence of said parallel disposed longitudinal pleats is increased.

4. A composite molding in accordance with claim 2, wherein said foil member has an accordion pleated configuration.

5. A composite molding strip in accordance with claim 2, wherein said foil member is aluminum.

6. A composite molding strip in accordance with claim 5, wherein said aluminum has a thickness of about 0.002 inch, a pleated amplitude of about 0.030, and the thickness of said strip is about 0.060 inch.

7. A composite molding strip in accordance with claim 2, wherein said foil member imparts a unique decorative feature to said strip.

8. A composite molding strip in accordance with claim 1, wherein said strip has a substantially flat configuration.

References Cited

UNITED STATES PATENTS

| 1,798,609 | 3/1931 | Knowlton | 161—130 |
| 2,928,201 | 3/1960 | Shanok et al. | 161—6 |
| 2,954,310 | 9/1960 | Truesdell et al. | 161—145 |
| 3,046,174 | 7/1962 | Brooks et al. | 161—216 |
| 3,440,129 | 4/1969 | Anselm | 161—5 |

JOHN T. GOOLKASIAN, Primary Examiner

R. A. KILLWORTH, Assistant Examiner

U.S. Cl. X.R.

161—6, 132, 133, 145, 213